United States Patent [19]

Renfro

[11] Patent Number: 5,048,881
[45] Date of Patent: Sep. 17, 1991

[54] LOCKABLE SEAL RING FOR AN ELECTRICAL METER

[76] Inventor: Bradley W. Renfro, 1005 Hazel St., Chico, Calif. 95928

[21] Appl. No.: 526,717

[22] Filed: May 21, 1990

[51] Int. Cl.$^5$ .......................... H02B 9/00; B65D 45/32
[52] U.S. Cl. .................................. 292/320; 292/256.6; 292/322; 292/307 B; 215/274
[58] Field of Search ............... 292/318, 319, 320, 321, 292/322, 256.6, 256.61, 256.63, 307; 220/319; 215/274, 275, 254, 252

[56] References Cited

U.S. PATENT DOCUMENTS

| | | |
|---|---|---|
| 734,177 | 7/1903 | Hull ........................................ 215/275 |
| 3,380,267 | 4/1968 | Winchester ........................... 292/307 |
| 3,712,655 | 1/1973 | Feuhrer ................................. 292/322 |
| 4,146,258 | 3/1979 | Andruchiw ......................... 292/256.6 |
| 4,149,741 | 4/1979 | Lipscomb et al. ................ 292/256.6 |
| 4,176,756 | 12/1979 | Gellman ............................... 220/319 |
| 4,226,102 | 10/1980 | Mattress, Jr. ...................... 292/256.6 |
| 4,331,012 | 5/1982 | Swisher ................................ 292/256.6 |
| 4,457,445 | 7/1984 | Hanks et al. ......................... 220/319 |
| 4,674,778 | 6/1987 | Ruiz ..................................... 292/256.6 |
| 4,702,093 | 10/1987 | DeWalch ............................ 292/256.6 |
| 4,828,300 | 5/1989 | Agbay ................................. 292/256.6 |

FOREIGN PATENT DOCUMENTS 2130147 11/1983 United Kingdom ............ 292/307 B

Primary Examiner—Eric K. Nicholson

[57] ABSTRACT

A one-piece seal ring for locking an electrical watt-hour meter into the socket of a meter base. The seal ring includes a locking mechanism which once locked cannot be unlocked without cutting or breaking a portion of the lock. The seal ring and locking mechanism are entirely manufactured of one-piece construction using a brightly colored, flexible and resilient thermoplastic, enabling the locking seal ring to be inexpensively manufactured with little or no manual labor using modern thermoplastic injection molding in automated machinery. The coloring of the lockable seal ring, being contrasting to that of the flange of the meter, provides structuring to provide a visual signal of an unlocked or missing seal ring on an installed electrical meter.

5 Claims, 9 Drawing Sheets

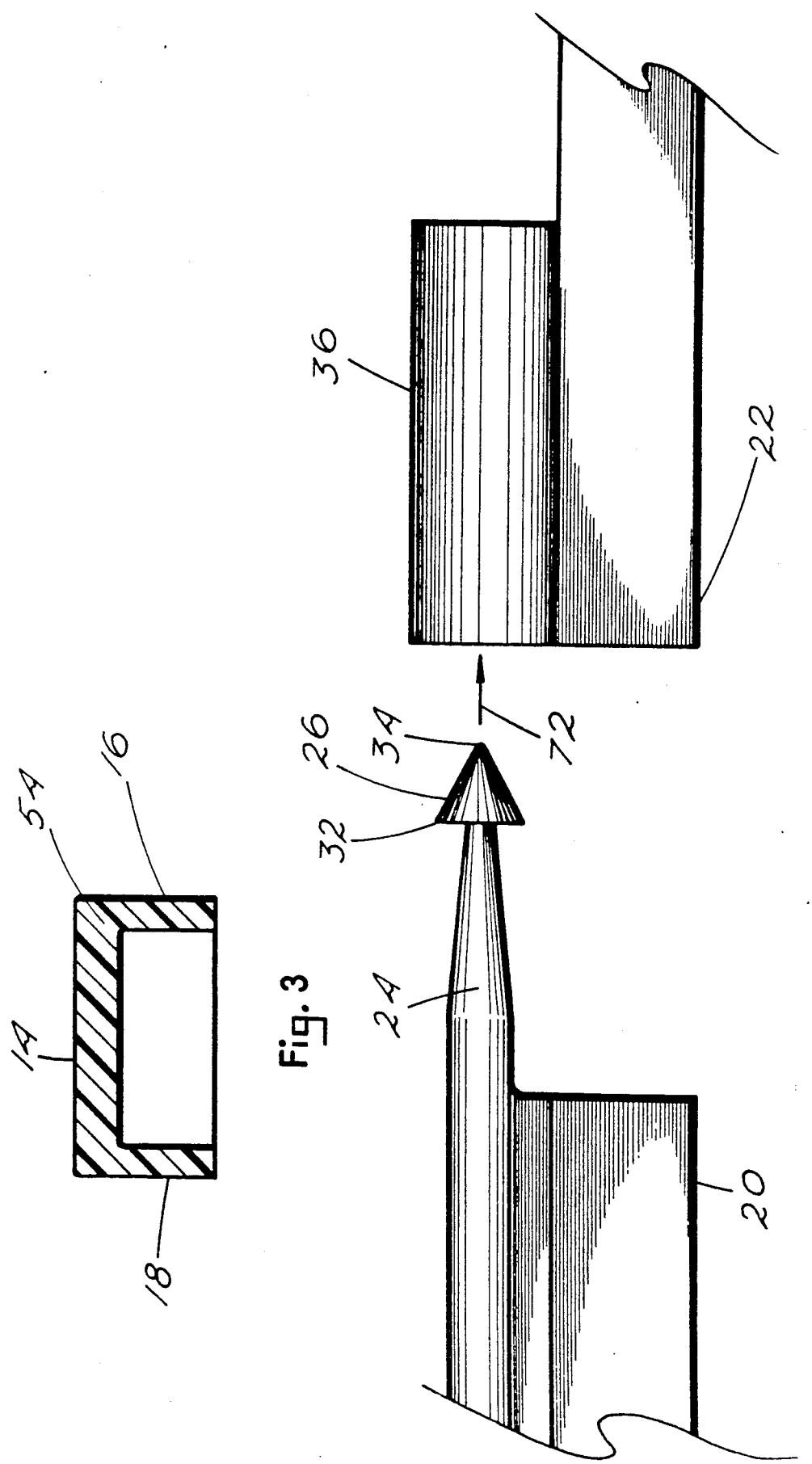

LOCKABLE SEAL RING FOR AN ELECTRICAL METER

BACKGROUND OF THE INVENTION

1. Field of the Invention

This invention relates to seal rings used to lock watt-hour electrical meters installed into meter sockets of electrical meter bases. The seal ring of this disclosure is particulary directed towards a thermoplastic, one-piece locking and tamper resistant seal ring.

2. Description of the Prior Art

Meter seal rings are commonly used to retain watt-hour electrical meters affixed in place in meter sockets. Although the meters are retained fairly securely against falling out of the meter base simply by the tight fit of the electrical tabs on the back of the meter stabbed into the jaws of the meter socket, seal rings do add a measure of insurance against the meter from falling out of the socket or becoming loose and leading to damaging electrical arcing. Meter seal rings, however, are primarily used to lock the meter onto the flange of the meter base to prohibit unauthorized individuals from removing the meter from the meter socket. Removal of the meter by unauthorized and untrained individuals on rare occasion can lead to shocks, eye and equipment damaging arcing. However, the main problem is removal of the meter by unauthorized persons with the intent to steal electricity from the power company. An electrical watt-hour meter installed properly in a meter base measures and records the amount of power consumed, with the recorded consumption usually read by a power company employee at the end of each month prior to billing the consumer. By simply pulling the meter out of the meter socket of the meter base, and reinstalling the meter upside down in the meter socket, the electricity still flows through the meter and out the load side for use by the consumer, however, the meter can run in reverse in this inverted position, subtracting already recorded consumption. The typical thief will then invert the meter in the socket shortly before the end of the month prior to the arrival of the meter reader. In this manner, a thief may have actually used 100 kilo-watts that month, and yet, when the meter reader reads the recorded consumption, the meter shows significantly less power used than was actually consumed. Many power companies estimate financial losses due to this type of thievery to be in the hundreds of millions of dollars per year.

Other methods are commonly being used to steal power, such as by jumping with conductors of some type across the load side to the line side conductors behind the meter in the meter socket. In any case, the vast majority of these methods involve the removal of the meter from the meter socket. In view of the above facts, meter seal rings have been designed to either lock or accept locks to prohibit removal of the watt-hour meter from the meter socket by unauthorized persons.

A patent search was conducted at the U.S. Patent and Trademark Office to examine past art meter seal rings, particulary seal rings specifically structured to be tamper resistant and having locking structures built onto the seal ring itself. Although there are many past art seal rings in use which are structured with lockable or locking mechanisms, the vast majority of these require keys to lock and unlock, and appear to have many parts to both manufacture and assemble, making the seal rings quite expensive to manufacture and purchase, and inconvenient to use. A seal ring described in U.S. Pat. No. 4,149,741, issued Apr. 17, 1979 to G.W. Lipscomb et al, teaches a one time use locking meter seal ring. The Lipscomb seal ring includes a permanent locking assembly affixed to the seal ring. The Lipscomb locking mechanism once locked can only be unlocked by breaking or cutting a portion of the lock. The Lipscomb lock is made of a plurality of separately manufactured parts of various materials, primarily metals, which are then apparently assembled at a factory. Due to the structuring of the Lipscomb locking mechanism, the seal ring with attached locking mechanism must in all likelihood be relatively expensive to manufacture and therefore expensive to purchase, which could be the reason I could not find the device available in the market place or in any sales catalog. Since the Lipscomb seal ring is a one time use device, appears expensive to manufacture and purchase due to many parts needing to be separately manufactured and assembled, it does not seem to be a feasible solution to the problem.

SUMMARY OF THE INVENTION

In order to solve problems associated with the theft of electricity through the manipulation of watt-hour meters, and the problems associated with past art meter seal rings, I have structured a disposable, improved seal ring for locking an electrical watt-hour meter to a meter base. My seal ring includes a locking mechanism which once locked, cannot be unlocked without cutting or breaking a lock pin portion of the lock. My seal ring and locking mechanism are entirely manufactured of one piece construction of a thermoplastic, enabling the device to be inexpensively manufactured with little or no manual labor using modern thermoplastic injection technology and automated machinery. The plastic used to manufacture my seal ring and lock structure is ultra-violet ray resistant to be durable in sunlight, and further of a type of plastic which cannot be glued or bonded easily with adhesives commonly available to the public unless they special order the adhesive from a specialty adhesives company. In order to purchase a suitable adhesive, one would have to know the type of plastic used to manufacture my seal ring. The use of a difficult to bond plastic prohibits the lock from being defeated and then repaired without detection by a thief. The plastic of my device is also colored in a contrasting color to that of the flange of the meter to allow visual detection of a missing or unlocked seal ring from a distance. Meter flanges are in all instances to the best of my knowledge, a silver-grey color, being usually made of aluminum and sometimes of thin steel. My contrastingly colored seal ring when placed around a meter in an unlocked position, gaps open giving a visual signal, leaving a visually detectable area of the silver-gray color of the meter flange showing through the gap between the two adjacent ends of my brightly colored seal ring. It is also very easy to detect a completely missing seal ring when a meter reader is accustomed to the contrasting color arrangement. This contrasting color arrangement is important, since often, meters are read by meter readers from quite a distance, often over a backyard fence with the aid of a pair of binoculars. Most past art meter ring seals are made of, and finished in brushed aluminum, making it difficult to detect a missing or open seal ring against the brushed aluminum flange of a meter from a distance.

It is therefore a primary object of my invention to provide an improved tamper resistant locking meter seal ring.

Another object of my invention is to provide the above in a seal ring which is disposable, being a seal ring which once locked and subsequently unlocked cannot be again locked.

Another object of my invention is to provide the above in a seal ring which is structured in a manner which can be manufactured at a low unit cost relative to past art meter seal rings.

Another object of my invention is to provide the above in a seal ring which can be manufactured using one piece construction through the use of modern thermoplastic injection molding processes without any secondary manufacturing processes necessary after the molding of my seal ring with lock structure.

Another object of my invention is to provide the above in a seal ring manufactured in a color which contrasts with the color of the meter flange to readily allow visual detection of a missing or unlocked seal ring.

Another object of my invention is to provide the above in a seal ring manufactured of a plastic which is UV resistant, of plastic being recyclable, non-electrically conductive, and very difficult to bond with adhesives.

Other objects and additional advantages of my invention will be recognized with a further reading of this disclosure and an examination of the attached drawing sheets.

BRIEF DESCRIPTION OF THE DRAWINGS

In the drawings:

FIG. 3 is a cross sectional view of my one piece meter seal ring illustrating the generally U-shaped cross section of the ring.

FIG. 4 is an enlargement of the locking mechanism of my seal ring in the open or unlocked position.

DESCRIPTION OF THE PREFERRED EMBODIMENT

Figure 13:
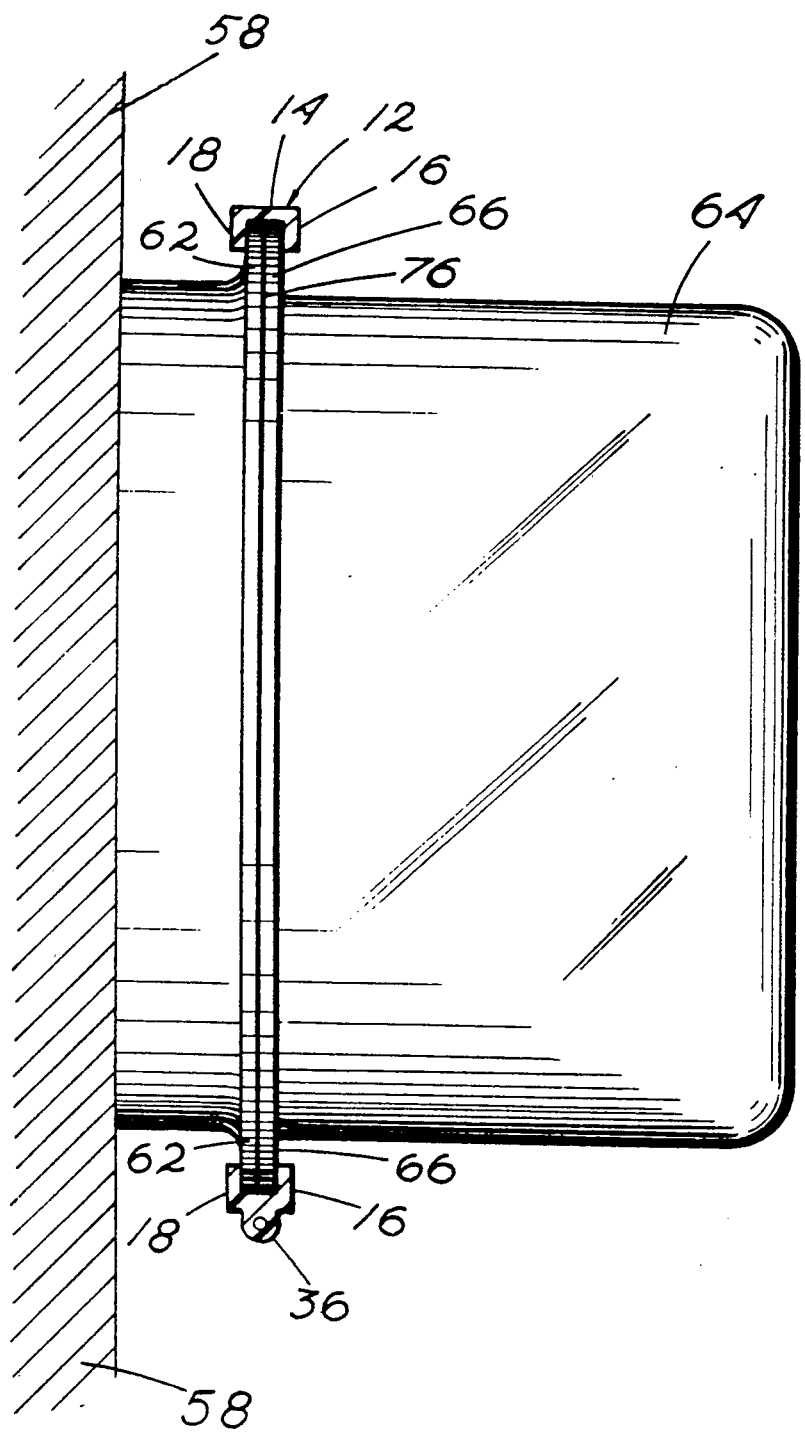
FIG. 13 is a side illustration of a meter base installed electrical meter with attached meter flange abutted against the flange of the meter base. My seal ring is shown sectioned with the two abutted flange fitted into the U-shaped interior of the seal ring preventing the removal of the watt-hour meter.

Referring now to the drawings in general where the structure of my one piece molded thermoplastic lockable seal ring 12 is shown in a variety of illustrations by itself and in use placed over, and tamper resistantly retaining of a pair of generally aligned and abutted circular flanges 76 as shown in FIG. 13. In drawing figures such as FIG. 4, 5, 9, and 10, directional arrows 72 are used to illustrate movement potentials and descriptions. The first flange in FIG. 13 of the pair of retained abutted circular flanges 76 is a watt-hour electrical meter flange 66 of a watt-hour electrical meter 64. The second flange of the pair of abutted circular flanges 76 is a meter retainment flange 62 of meter base 58. Seal ring 12 when in a locked position 50 is sized to fit fairly snugly on abutted flanges 76. For background information, meter retainment flange 62 surrounds meter socket 60 of meter base 58. Meter socket 60 contains line and load side electrical bussing jaws (not shown) which connect to the conductive tabs 68 on the back side of meter 64. Meter base 58 may or may not contain circuit interrupters such as fuses or breakers, and usually has a line and load conduit 70 for wiring entering and leaving the meter base 58.

Figure 2:
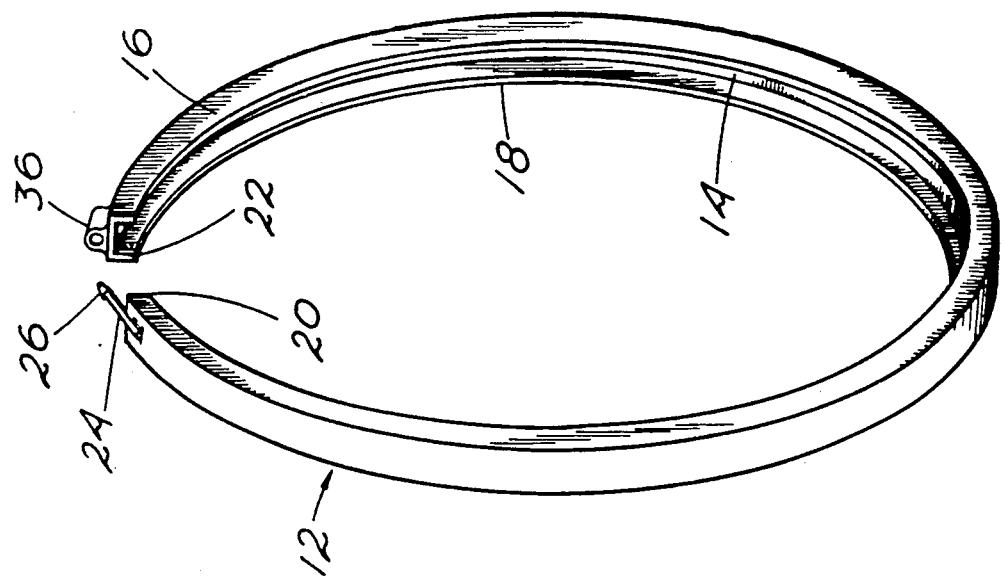
FIG. 2 is a perspective view of my one piece meter seal ring in the normally open or unlocked position.

My lockable seal ring 12 is structured of a generally annular sidewall 14 having a front flange 16 and a rear flange 18 spaced apart from one another, with front flange 16 and rear flange 18 each extending radially inwardly from annular sidewall 14 shown best in FIG. 2, 3 and 13. Spacing between front flange 16 and rear flange 18 must be sufficient to straddle the pair of abutted flange 76 as shown in FIG. 13. Although flanges 16 and 18 are designated front and rear flanges, my lockable seal ring 12 is completely reversible for use, and therefore really does not have a front or rear side.

Figure 1:
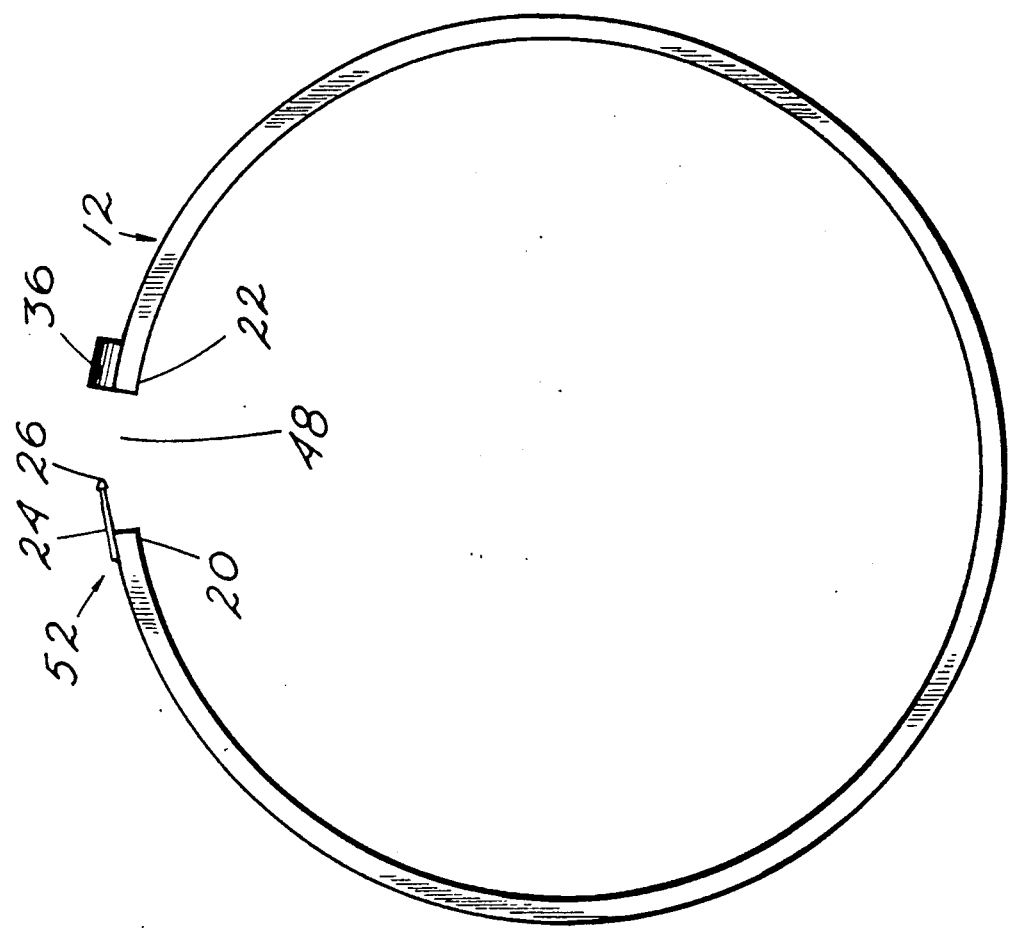
FIG. 1 is a side view of my one piece lockable meter seal ring and lock in the normally open or unlock position.

Seal ring 12 is transversely split to provide a first ring end 20 and an adjacent second ring end 22 shown best in FIG. 1 and 2. FIG. 3 shows annular sidewall 14 and front and rear flanges 16 and 18 cross-sectioned forming a U-shape. Also depicted in FIG. 3 is the ring structure manufactured of flexible and resilient thermoplastic material 54. First ring end 20 and second ring end 22 of seal ring 12 are sufficiently moveable toward and away from one another by way of the flexibility and resiliency of annular sidewall 14 and front and rear flanges 16 and 18 due to the use of thermoplastic material 54 to make the structures 14, 16, and 18. The ability to move the ring ends 20 and 22 relative to each other allows installation and removal of the seal ring 12 onto and off of the pair of abutted circular flanges 76. Although annular sidewall 14 and front and rear flanges 16 and 18 are made of a generally flexible and resilient thermoplastic 54, flanges 16 and 18 are sufficiently rigid to prohibit removal of meter 64 when retained by seal ring 12 by simply pulling on meter 64 and flexing front flange 16 outward to release meter 64.

Figure 5:
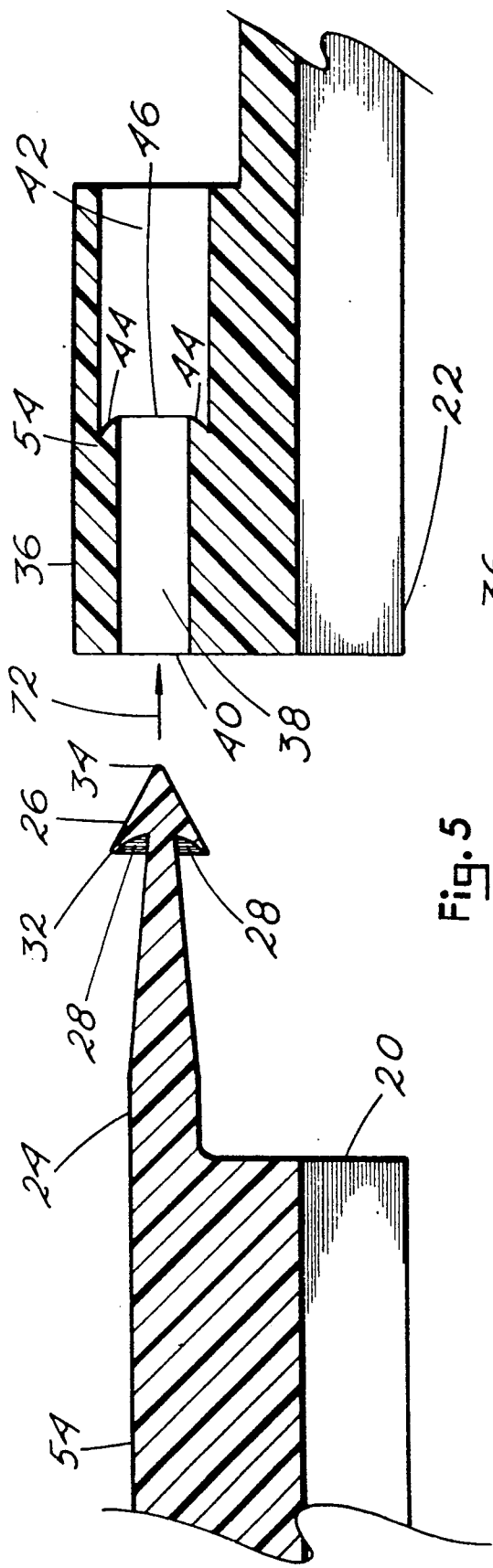
FIG. 5 is an enlarged sectional illustration depicting the locking mechanism of my seal ring in the open or unlocked position.
Figure 7:
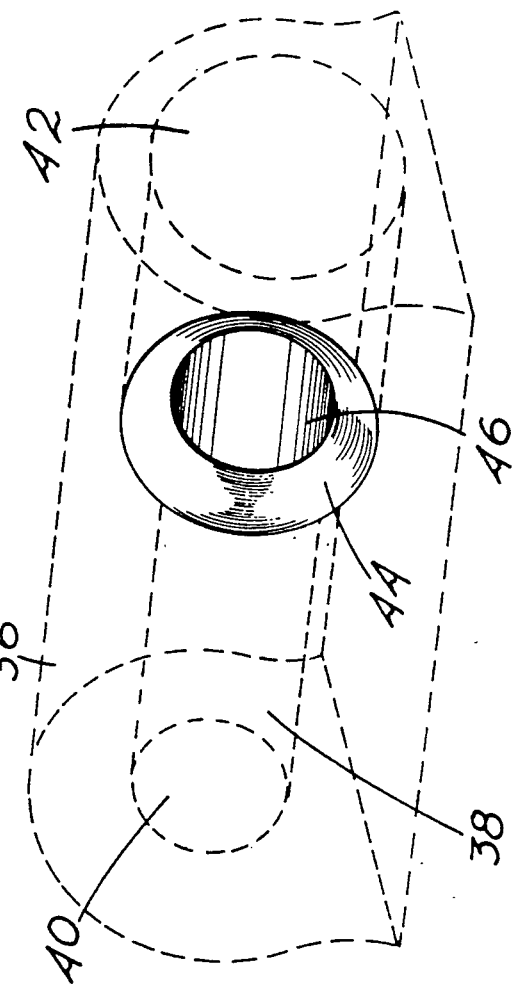
FIG. 7 is a partially phantom view of the lock housing of my seal ring depicting the convexed wall surrounding the entrance the receiver tube into the enlarged area of the receiver tube.
Figure 6:
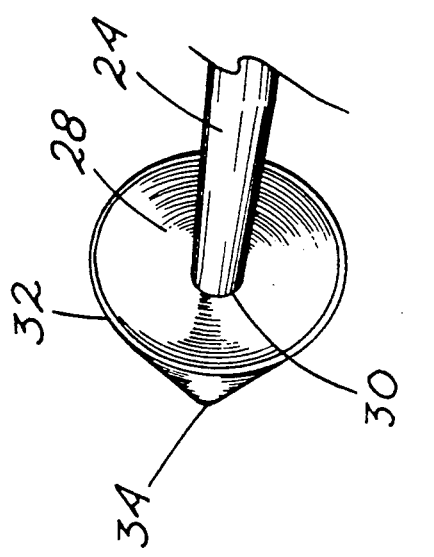
FIG. 6 is an enlarged perspective view of the conically shaped enlarged collapsible tip of the lock pin of my seal ring.

In FIG. 1, seal ring 12 is shown in a normally open position 52, that is, being unlocked and having a relatively wide gap 48 between the two ring ends 20 and 22. Also shown in FIG. 1 and 2 are the two main components of the lock structure of my lockable seal ring 12, being lock pin 24 molded onto first ring end 20, and lock housing 36 molded onto second ring end 22. As can be seen in FIG. 5, lock pin 24 and lock housing 36 are also made of thermoplastic material 54. Actually, every part of my lockable seal ring 12 is molded as one piece in a plastic injection mold and injection machine in a single molding process, making the seal ring 12 of single piece construction needing no assembly, and very inexpensive to manufacture. Suitable thermoplastics 54 for molding locking seal ring 12 which are very difficult to glue or bond with adhesives are polypropylene or polyethylene for example. More on the molding process will be described later.

Referring now to FIG. 4 through 7 where enlarged views of the lock structure of my seal ring 12 are illustrated. The locking structure includes lock pin 24 affixed at a first end thereof to first ring end 20, with lock pin 24 extending and aiming toward second ring end 22, and more particular aiming toward an opening 40 in lock housing 36. Lock pin 24 includes a conically shaped enlargement 26 affixed at an end of lock pin 24 oppositely disposed from the ring end 20 attached end of lock pin 24. Conically shaped enlargement 26 has a pointed or tapered end 34 oppositely disposed from lock pin 24 to assist in starting enlargement 26 through opening 40 in lock housing 36. Conically shaped enlargement 26 has a concaved recess 28 and gradually outwardly thinning plastic about a center attachment point 30 between lock pin 24 and the enlargement 26 shown best in FIG. 6. Concaved recess 28 allows inward collapsibility of flexible widened portion 32 of conically shaped enlargement 26 when under pressure shown best in FIG. 8. Conically shaped enlargement 26 is manufactured of thermoplastic material 54, and is therefore flexible and resilient, with the resiliency of material 54 relied upon to expand an inwardly collapsed conically shaped enlargement 26 outward subsequent to collapsing and release of the pressure responsible for the collapsing shown best in FIG. 9.

Figure 8:
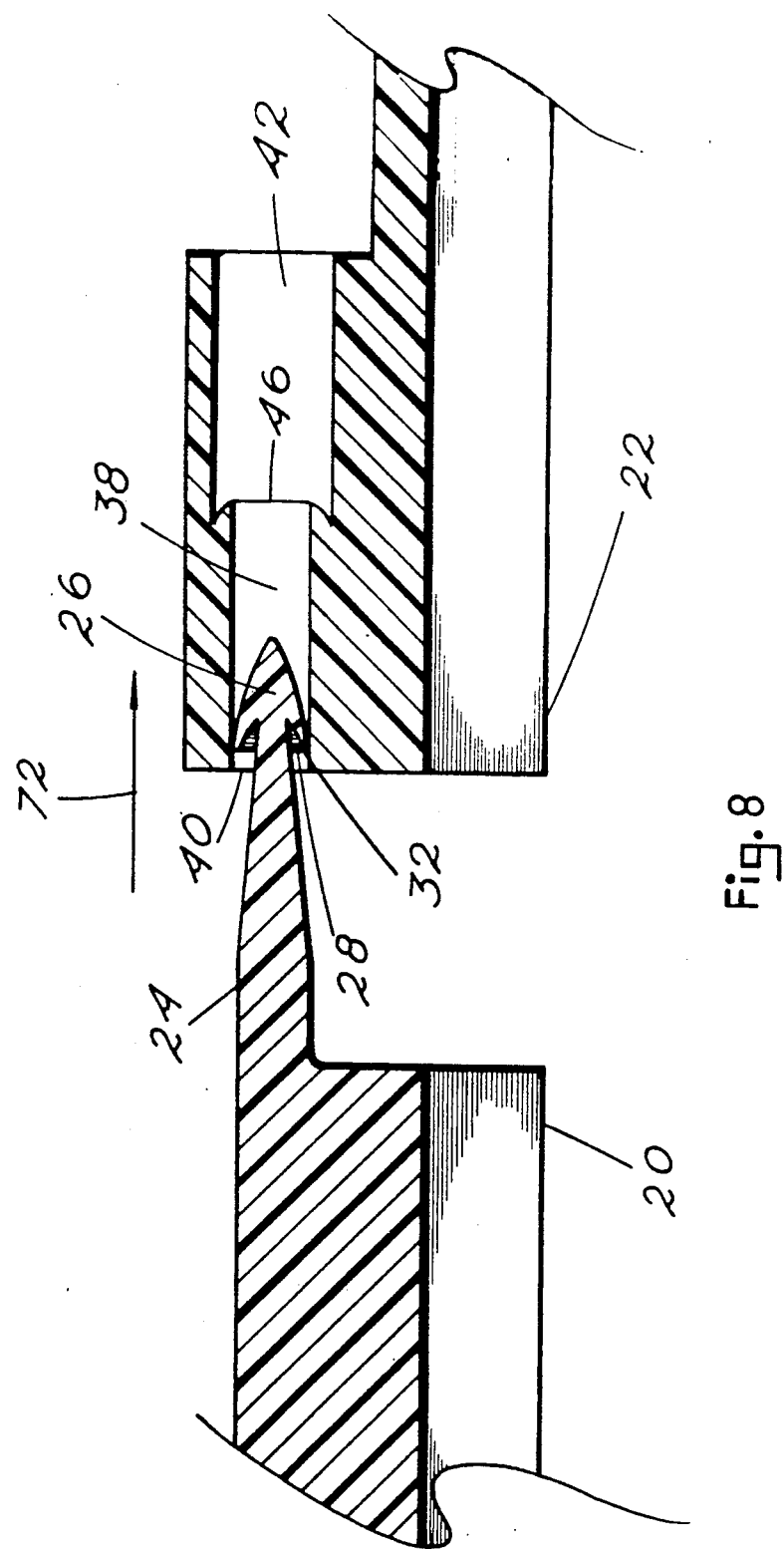
FIG. 8 is an enlarged sectional side view of the lock pin in the process of being inserted through the receiver tube of the lock housing.
Figure 9:
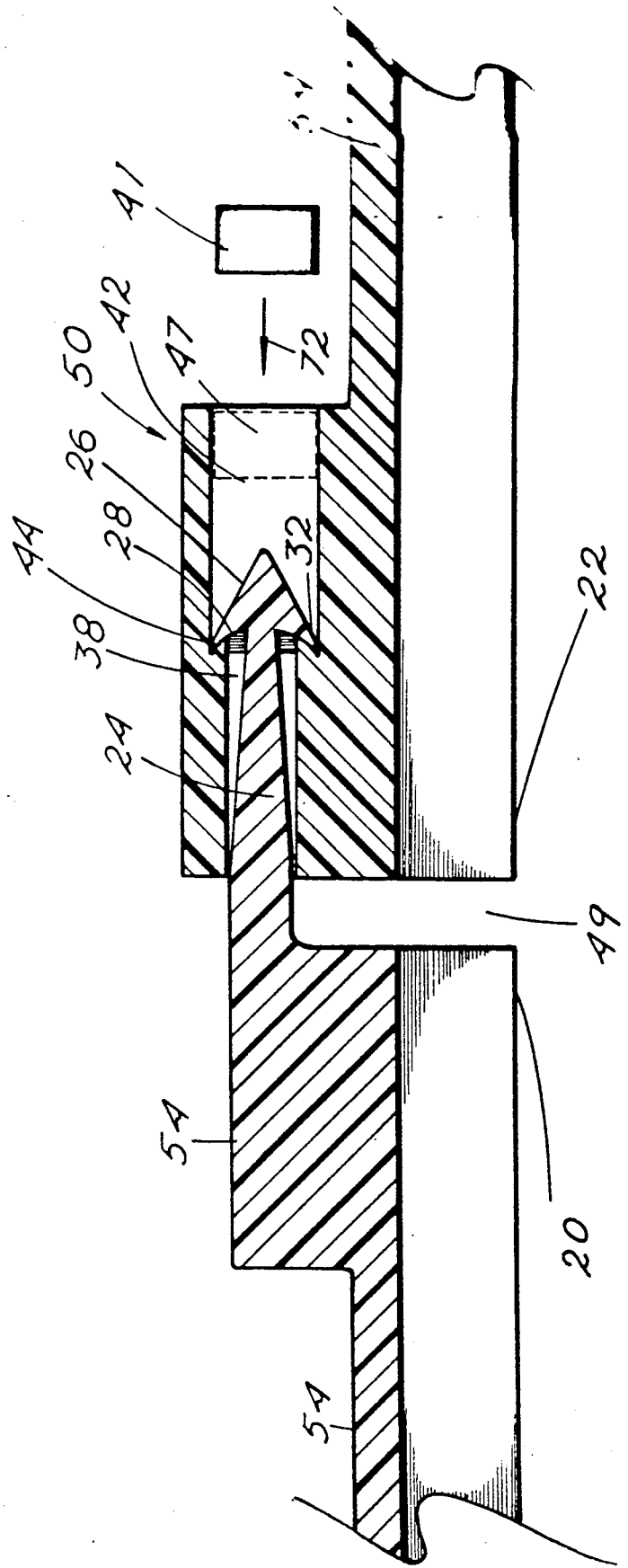
FIG. 9 is an enlarged sectional view of the lock pin with cone shaped enlargement fully inserted into the lock housing. My lock structure is shown in the locked or closed position and having a significantly reduced gap between the two ring ends. An optional plug is shown positioned for insertion into one end of the lock housing.
Figure 10:
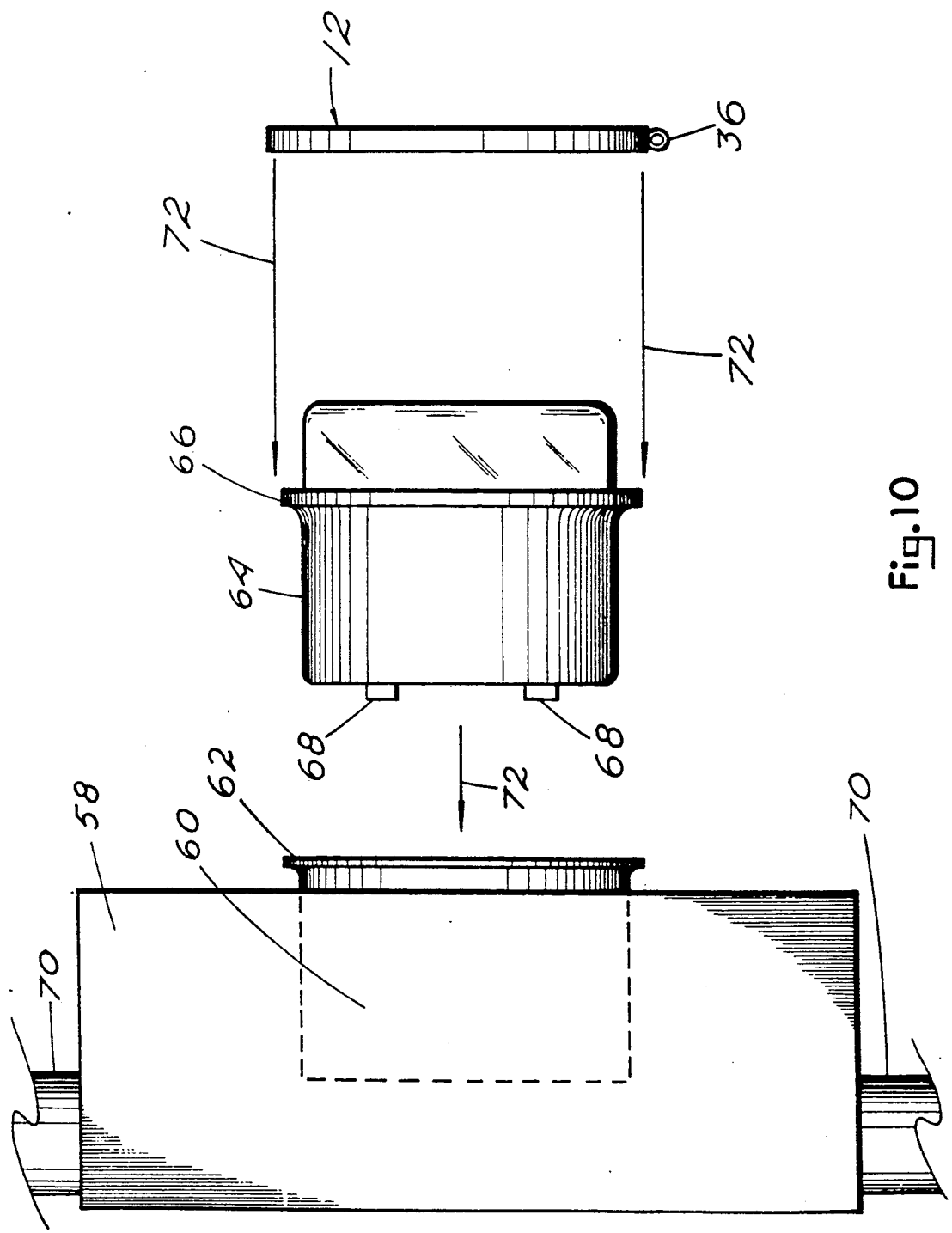
FIG. 10 is a side illustration depicting a meter base with meter socket therein, a meter base flange affixed to, and extending from the meter base around the meter socket, a watt-hour meter positioned for insertion into the meter socket, and my meter seal ring positioned to be installed onto the meter flange and meter base flange.

Lock housing 36 has a receiver tube 38 and receiver tube opening 40 placed in alignment to accept conically shaped enlargement 26 there into as shown in FIG. 5, 8, and 9. Receiver tube 38 is sized to accept conically shaped enlargement 26 pushed therethrough with the acceptance providing pressure to collapse flexible widened portion 32 of conically shaped enlargement 26. Receiver tube 38 has an open enlarged area 42 at one end thereof, with enlarged area 42 oppositely disposed from receiver tube opening 40. Where receiver tube 38 enters enlarged area 42, designated entrance 46, a convexed wall 44 surrounds entrance 46 shown best in FIG. 7. Enlarged area 42 is sized sufficiently large diametrically to relieve pressure applied to conically shaped enlargement 26 by receiver tube 38 and allow expansion of flexible widened area 32. Once flexible widened area 32 is fully within enlarged area 42 and has expanded, withdrawal pressure caused by annular sidewall 14 and front and rear flanges 16 and 18 attempting to return to a normally open position 52, pull conically shaped enlargement 26 against convexed wall 44. Convexed wall 44 abuts and generally fits within concaved recess 28 to prevent removal of conically shaped enlargement 26 back through entrance 46 and receiver tube 38 in a reverse direction from the installation. When convexed wall 44 is abutted and fitting within concaved recess 28, any pulling pressures against conically shaped enlargement 26 are applied generally against thickened plastic around attachment point 30 and in front of attachment point 30 within the conically shaped enlargement 26 itself, shown best in FIG. 9. These specific points of pressure coupled with the interior sidewalls of recess tube 38 being in close proximity to the outer edges of flexible widened area 32 prevent widened area 32 from folding back and allowing withdrawal of conically shaped enlargement 26 through receiver tube 38.

Figure 11:
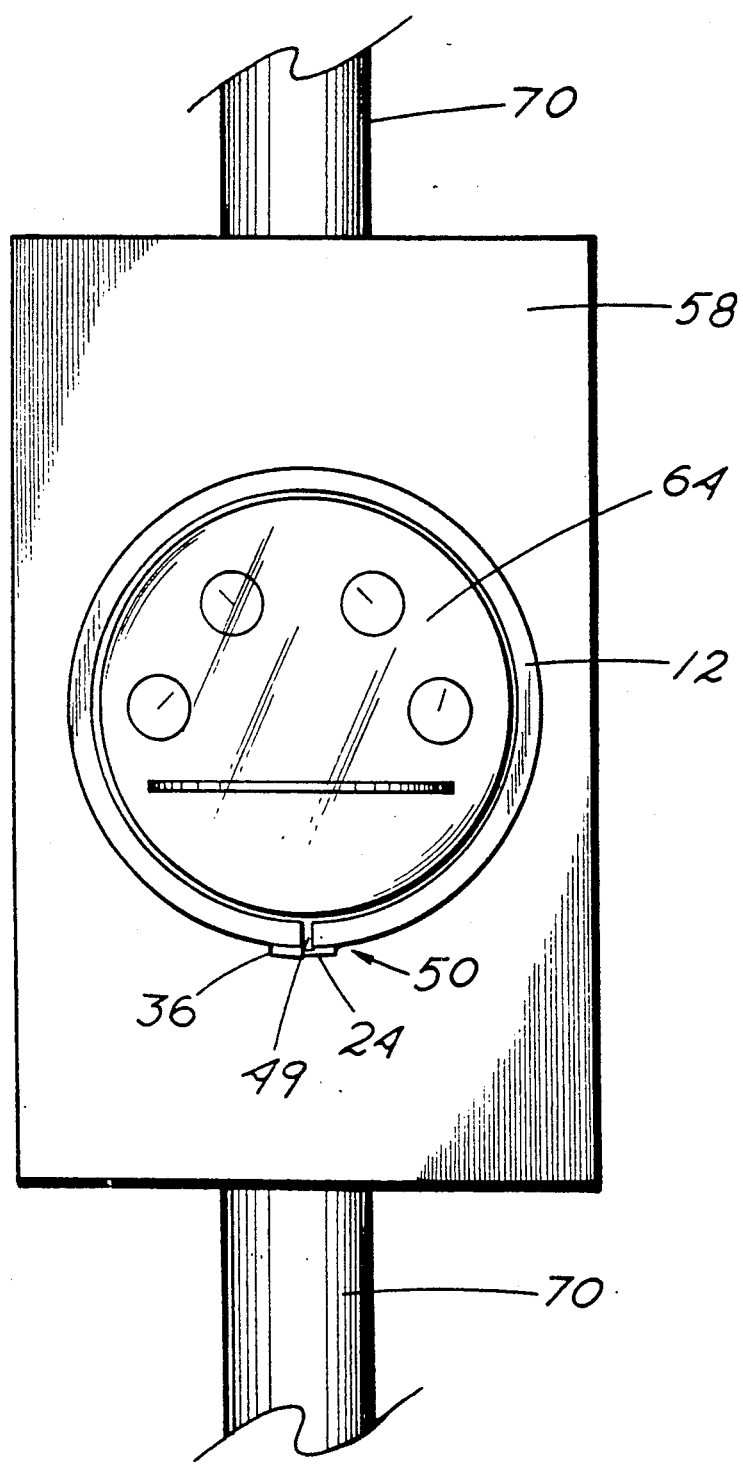
FIG. 11 is a frontal view of the components described in FIG. 10 assembled. My seal ring is shown in the locked or closed position on the watt-hour meter.
Figure 12:
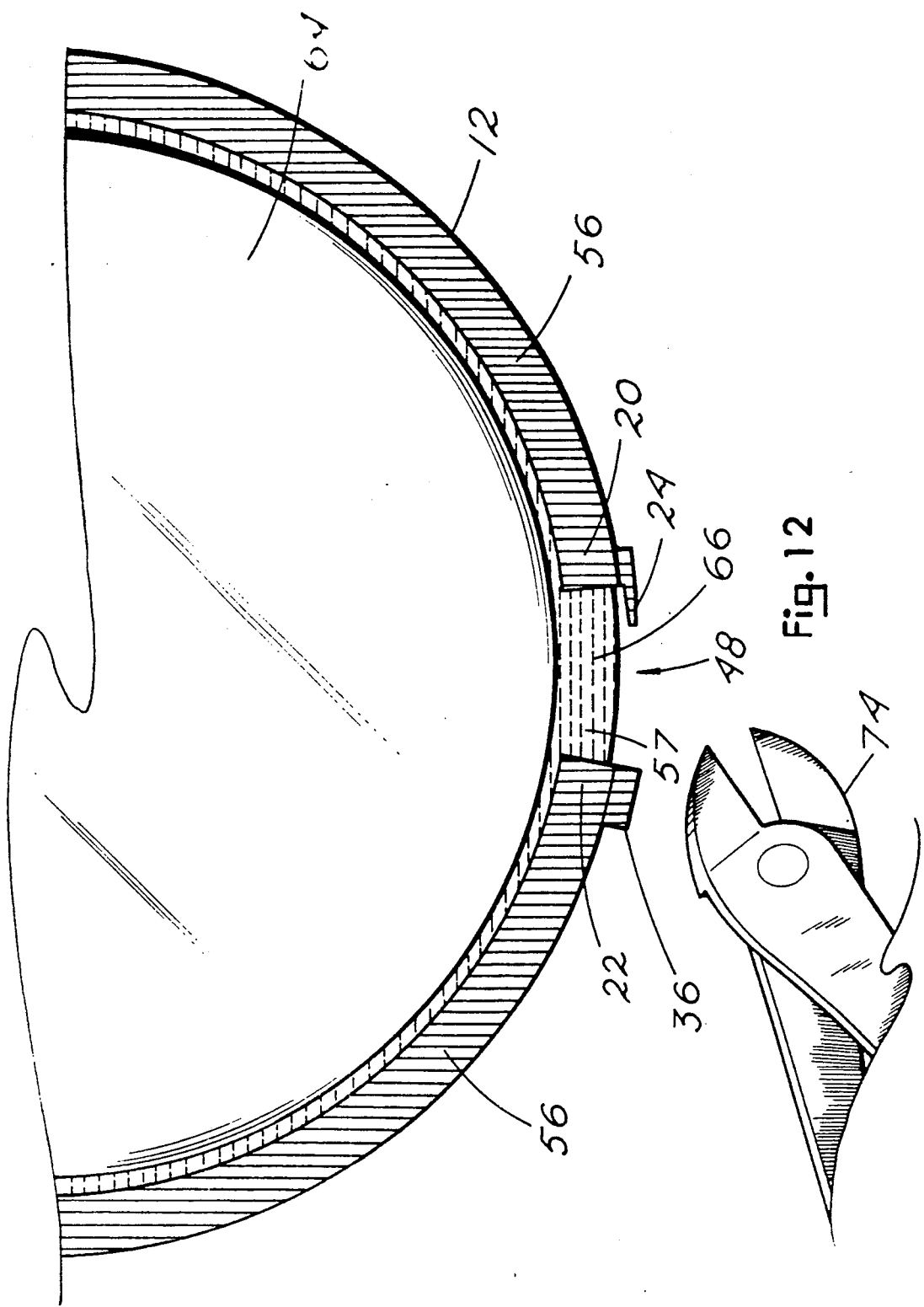
FIG. 12 is a partial frontal view of my seal ring placed around a watt-hour meter. The lock pin of my lock structure has just been cut with a pair of cutting pliers to unlock the ring. The meter flange is shown as a silver-grey color, and my seal ring is shown as a contrasting color, that is pink or red.

As stated above, seal ring 12 when in a normally open position 52 has a wide gap 48 between first ring end 20 and second ring end 22. Seal ring in a locked position 50 on a pair of abutted circular flanges 76 has a reduced gap 49 from that of gap 48 of the normally open position 52. This variance in gaping does have a specific purpose. Seal ring 12 is moled in a pigmented or colored thermoplastic 54, such as pink or red 56 for example, shown in FIG. 12 to contrast in color with meter flange 66 of meter 64 which is shown as grey or silver 57 in FIG. 12. Gray or silver is generally the color of a typical meter flange 66. When my contrastingly colored seal ring 12 is manually spread and placed over two abutted flanges 76, and left unlocked, wide gap 48 is present. The seal ring 12 is then locked by inserting lock pin 24 with attached conically shaped enlargement 26 into lock housing 36. The locking process of forcing first and second ring ends 20 and 22 together greatly reduces the width of the gap to that of reduced gap 49. In effect, with seal ring 12 in the lock position 50 as shown in FIG. 11, it is fairly simple to visually see a properly placed and locked seal ring 12. If a thief cuts lock pin 24 with a pair of wire cutters 74, which is the method supposed to be used only by power company employees as shown in FIG. 12, seal ring 12 returns to a normally open position 52 with wide gap 48. This situation leaves a wide strip of gray or silver color 57 showing between the pink or red 56 colored ring ends 16 and 18, a visual signal of an unlocked seal ring 12 which can easily be detected for quite a distance. It is anticipated that just the first and second ring ends 16 and 18 could be contrastingly colored and achieve similar results, rather than the entire ring structure 12.

As shown in FIG. 9, a optional plug 47 may be used to plug the open end of enlarged area 42 of receiver tube 38. Plug 47 would require a secondary manufacturing process, and therefore is not desirable unless it was found thieves were somehow able to defeat the lock through that open end of enlarge area 42 oppositely disposed from entrance 46.

As stated above, seal ring 12 including all parts forming the locking structure thereof are molded as a single unit in a plastic injection mold and automated injection molding machine. Once the mold is installed into the injection machine and properly set-up, this type of machinery can operate making seal rings 12, basically unattended. Each time the thermoplastic is "shot" into the mold, and sufficiently cooled, the mold is parted and the seal ring or rings 12, depending on the number of cavities in the mold are ejected and fall into a shipping box below to be sold by weight if desired. This method of manufacturing of my lockable seal ring 12 allows the rings 12 to be made and sold very inexpensively. Those skilled in the art of tool and die engineering will recognize the need for a collapsible center core in the mold to form the U-shaped ring, and a slide pin to form receiver tube 38 in lock housing 36. The mold will also require specifically timed parting and ejection of the seal ring 12 while thermoplastic 54 is still warm in order to avoid the use of a relatively expensive second slide to form concaved recess 28 around lock pin 24.

Although I have described in detail and shown my invention in drawings for exemplification purposes to allow those skilled in the art to both build and use my invention, the descriptions and drawings are not intended to limit the scope of this patent to less than the intended scope of the appended claims.

What I claim as may invention is:

1. A lockable seal ring for placement over and tamper resistant retainment of a pair of generally aligned circular flanges abutted against one another, a first flange of said pair of circular flanges being a watt-hour electrical meter flange, a second flange of said pair of circular flanges being a meter retainment flange affixed to a meter base, said lockable seal ring structured of a generally annular sidewall having a front flange and a rear flange spaced apart from one another, said front flange and said rear flange each extending radially inwardly from said annular sidewall, said seal ring transversely split to provide a first ring end and an adjacent second ring end, said first ring end and said second ring end of said seal ring sufficiently moveable toward and away from one another by way of flexibility and resiliency of said annular sidewall and said front and rear flanges to allow installation and removal of said seal ring onto and off of said pair of abutted circular flanges;

a locking means affixed to said seal ring adapted to lock said first ring end in close proximity to said second ring end, said locking means including a lock pin affixed at a first end thereof to said first ring end, said lock pin extending generally toward said second ring end, said lock pin including a generally conically shaped enlargement affixed at an end of said lock pin oppositely disposed from said first end of said lock pin, a generally tapering end of said conically shaped enlargement oppositely disposed from said lock pin, said conically shaped enlargement concaved about a generally centered attachment point between said lock pin an said conically shaped enlargement, the concavity providing for inward collapsibility of flexible portion of said conically shaped enlargement when under pressure, said conically shaped enlargement manufactured of a generally flexible and resilient material with said resiliency of said material adapted to expand a collapsed said conically shaped enlargement outward subsequent to collapsing and release of pressure responsible for said collapsing, said locking means further including a lock housing affixed to said second ring end, said lock housing having a receiver tube with a receiver tube opening placed in alignment to accept said conically shaped enlargement, said receiver tube sized to accept said conically shaped enlargement pushed there into with said acceptance provided pressure to collapse said flexible portion of said conically shaped enlargement, said receiver tube having an enlarged area at one end thereof with said enlarged area oppositely disposed from said receiver tube opening, a convex wall surrounding an entrance of said receiver tube into said enlarged area of said receiver tube, said enlarged area of said receiver tube sized sufficiently large to relieve pressure applied to said conically shaped enlargement by said receiver tube, said convex wall adapted to generally fit within the concavity of said conically shaped enlargement thereby preventing removal of said conically shaped enlargement from said lock housing in a reverse direction from the installation there into;

said seal ring in a normally open position having a gap between said first ring end and said second ring end, said seal ring in a locked position having a reduced said gap from that of sad normally open position of said seal ring;

said lockable seal ring manufactured of single piece construction of a generally flexible and resilient thermoplastic material, said thermoplastic material generally of a contrasting color to that of said watt-hour electrical meter flange.

2. A lockable seal ring for placement over and tamper resistant retainment of a pair of generally aligned circular flanges abutted against one another, a first flange of said pair of circular flanges being a watt-hour electrical meter flange, a second flange of said pair of circular flanges being a meter retainment flange affixed to a meter base, said lockable seal ring structured of a generally annular sidewall having a front flange and a rear flange spaced apart from one another, said front flange and said rear flange each extending radially inwardly from said annular sidewall, said seal ring transversely split to provide a first ring end and an adjacent second ring end, said first ring end and said second ring end of said seal ring sufficiently moveable toward and away from one another by way of flexibility and resilience of said annular sidewall and said front and rear flanges to allow installation and removal of said seal ring onto and off of said pair of abutted circular flanges;

a locking means affixed to said seal ring adapted to lock said first ring end in close proximity to said second ring end, said locking means including a lock pin affixed at a first end thereof to said first ring end, said lock pin extending generally toward said second ring end, said lock pin including an enlargement affixed at an end of said lock pin oppositely disposed from said first end of said lock pin, a generally tapering end of said enlargement oppositely disposed from said lock pin, said enlargement having means providing inward collapsibility of a widened portion of said enlargement when under pressure, said enlargement manufactured of a generally flexible and resilient material with said resiliency of said material adapted to expand a collapsed said widened portion of said enlargement outward subsequent to collapsing and release of pressure responsible for said collapsing, said locking means further including a lock housing affixed to said second ring, end, said lock housing having a receiver tube with a receiver tube opening placed in alignment to accept said enlargement, said receiver tube sized to accept said enlargement pushed there into with said acceptance providing pressure to collapse said widened portion of said enlargement, said receiver tube having an enlarged area at one end thereof with said enlarged area oppositely disposed from said receiver tube opening, a wall surrounding an entrance of said receiver tube into said enlarged area of said receiver tube, said enlarged area of said receiver tube sized sufficiently large to relieve pressure applied to said widened portion of said enlargement by said receiver tube, said wall adapted to abut said widened portion of said enlargement thereby preventing removal of said enlargement from said lock housing in a reverse direction from the installation there into;

said seal ring in a normally open position having a gap between said first ring end and said second ring end, said seal ring in a locked position having a reduced said gap from that of said normally open position of said seal ring;

said lockable seal ring manufactured of single piece construction of a generally flexible and resilient thermoplastic material;

color contrasting means on said seal ring contrasting to a color of said watt-hour electrical meter flange.

3. A lockable seal ring for placement over and tamper resistant retainment of a pair of generally aligned circular flanges abutted against one another, a first flange of said pair of circular flanges being a watt-hour electrical meter flange, a second flange of said pair of circular flanges being a meter retainment flange affixed to a meter base, said lockable seal ring structured of a generally annular sidewall having a front flange and a rear flange spaced apart from one another, said front flange and said rear flange each extending radially inwardly from said annular sidewall, said seal ring transversely split to provide a first ring end and an adjacent second ring end, said first ring end and said second ring end of said seal ring sufficiently moveable toward and away from one another by way of flexibility and resiliency of said annular sidewall and said front and rear flanges to allow installation and removal of said seal ring onto and off of said pair of abutted circular flanges;

a locking means affixed to said seal ring adapted to lock said first ring en din close proximity to said second ring end, said locking means including a lock pin affixed at a first end thereof to said first ring end, said lock pin aiming generally toward said second ring end, said lock pin including at least one enlargement affixed at an end of said lock pin oppositely disposed from said first end of said lock pin, a generally tapering end of said at least one enlargement oppositely disposed from said lock pin, said at least one enlargement having a widened portion thereon, said locking means further including a lock housing affixed to said second ring end, said lock housing having a receiver tube with a receiver tube opening placed in alignment to accept said at least one enlargement, said receiver tube sized to accept said at least one enlargement pushed there into, said receiver tube having an enlarged area at one end thereof with said enlarged area oppositely disposed from said receiver tube opening, a wall surrounding an entrance of said receiver tube into said enlarged area of said receiver tube, said wall adapted to abut said widened portion of said at least one enlargement thereby preventing removal of said at least one enlargement from said lock housing in a reverse direction from the installation there into;

said lockable seal ring manufactured of single piece construction of a generally flexible and resilient thermoplastic material;

color contrasting means on said seal ring contrasting to a color of said watt-hour electrical meter flange.

4. A lockable seal ring for placement over and tamper resistant retainment of a pair of generally aligned flanges abutted against one another, a first flange of said pair of flanges being a watt-hour electrical meter flange, a second flange of said pair of flanges being a meter retainment flange affixed to a meter base, said lockable seal ring structured of a generally annular sidewall having a front flange and a rear flange spaced apart from one another, said front flange and said rear flange each extending radially inwardly from said annular sidewall, said seal ring transversely split to provide a first ring end and an adjacent second ring end, said first ring end and said second ring end of said seal ring sufficiently moveable toward and away from one another to allow installation and removal of said seal ring onto and off of said pair of abutted flanges;

a locking means affixed to said seal ring adapted to lock said first ring end in close proximity to said second ring end, said locking means including lock engagement means on said first ring end, said locking means further including a lock housing on said second ring end, said lock housing having a receiver tube with a receiver tube opening placed in alignment to accept said lock engagement means, said receiver tube sized to accept said lock engagement means pushed there into, said receiver tube having at least one area therein having means adapted to engage said lock engagement means thereby preventing withdrawal of said lock engagement means from said lock housing in a reverse direction from the installation there into;

said lockable seal ring manufactured of single piece construction of a generally flexible and resilient material, color contrasting means on said seal ring contrasting to a color of said watt-hour electrical meter flange.

5. A loackable seal ring according to claim 4 wherein said material is thermoplastic material.

* * * * *